United States Patent

Khoi et al.

[11] Patent Number: 5,806,363
[45] Date of Patent: Sep. 15, 1998

[54] TANK LEVEL GAUGE OF DRIVEN SENSOR TYPE

[75] Inventors: Danny James Khoi; Pierre Gonzalez, both of Rueil Malmaison; Denis Buffenoir, Chatou, all of France

[73] Assignees: Institut Francais du Petrole; Danny J. Khoi, both of Rueil-Malmaison, France

[21] Appl. No.: 636,276

[22] Filed: Apr. 29, 1996

Related U.S. Application Data

[63] Continuation of Ser. No. 39,098, Jul. 29, 1993, abandoned.

[30] Foreign Application Priority Data

Aug. 9, 1991 [FR] France ................... 91 10257

[51] Int. Cl.$^6$ ......................................... G01F 23/44
[52] U.S. Cl. ............................................. 73/313; 73/321
[58] Field of Search ............................. 33/714, 719, 720, 33/721; 318/642; 73/309, 313, 319, 321

[56] References Cited

U.S. PATENT DOCUMENTS

| | | | |
|---|---|---|---|
| 3,017,771 | 1/1962 | Bonhomme | 33/714 |
| 4,244,219 | 1/1981 | Takahashi | 73/321 X |
| 4,459,584 | 7/1984 | Clarkson | 73/321 X |
| 4,527,107 | 7/1985 | van der Pol et al. | 73/321 X |
| 4,573,272 | 3/1986 | Golinelli et al. | 33/558 X |
| 4,700,479 | 10/1987 | Saito et al. | 33/402 |
| 5,012,589 | 5/1991 | Remion | 33/719 X |
| 5,136,883 | 8/1992 | Jannotta | 73/321 |

FOREIGN PATENT DOCUMENTS

| | | |
|---|---|---|
| 8906346 | 7/1989 | European Pat. Off. . |
| 1430366 | 1/1966 | France . |
| 41-12085 | 2/1966 | Japan ................. 73/321 |
| 757858 | 8/1980 | U.S.S.R. ............... 73/313 |
| 1015118 | 6/1963 | United Kingdom ........ 33/720 |
| 1015118 | 12/1965 | United Kingdom . |

*Primary Examiner*—Thomas B. Will
*Assistant Examiner*—Willie Morris Worth
*Attorney, Agent, or Firm*—Antonelli, Terry, Stout & Kraus, LLP

[57] ABSTRACT

A level gauge for a tank of a driven sensor type includes a drum around which is wound a thread on the end of which is suspended a driven level sensor. A reversible servomotor drives the drum with the drum being driveable in reverse directions. The rotation of the drum is recorded and a variation in the force of the thread is detected. The force is directly related to the relative position of the sensor with respect to the level being measured. The detector for detecting the variation in the force in the thread includes an element rotatably mounted about a horizontal axis, with an oscillation of the element being limited by a damping arrangement, with movement of the element enabling the force exerted on the thread to be measured.

12 Claims, 2 Drawing Sheets

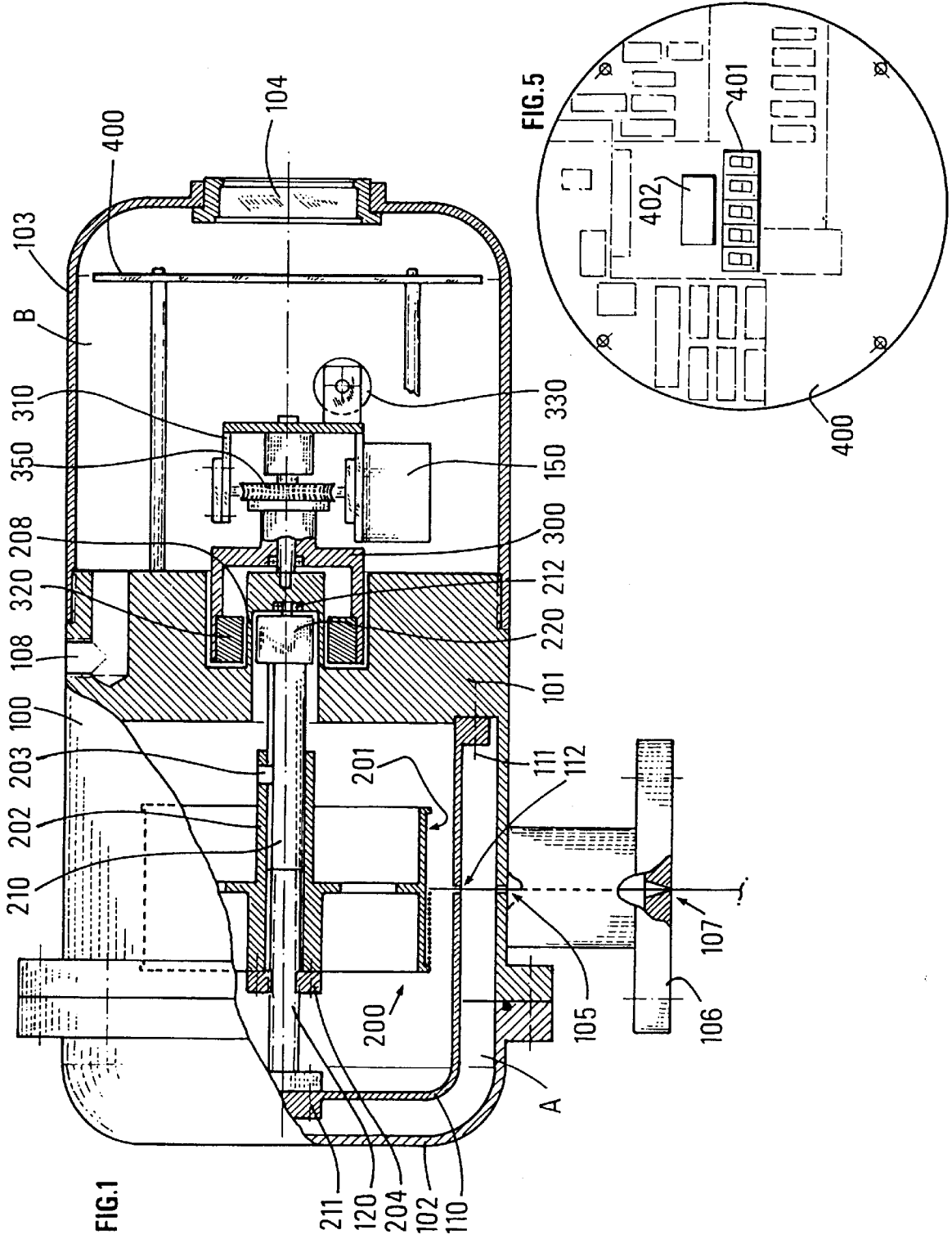

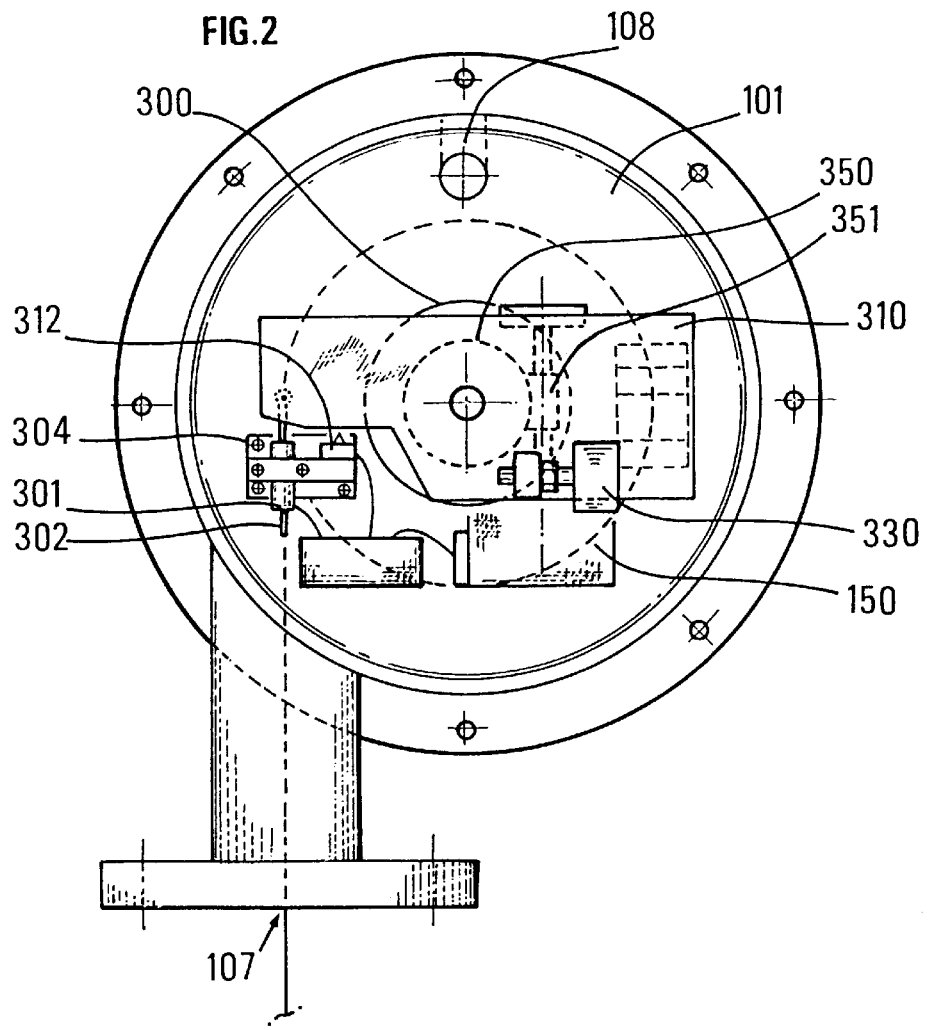
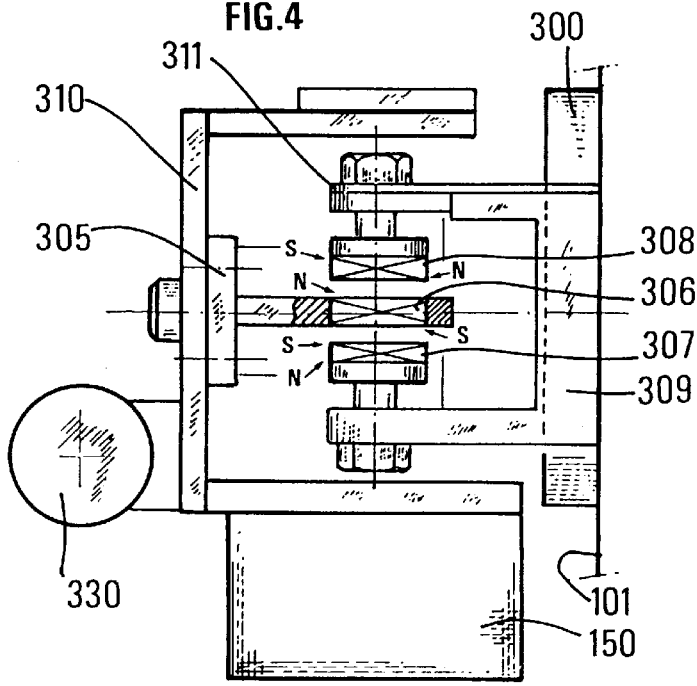
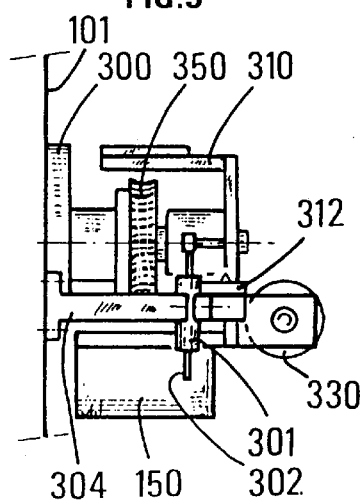

TANK LEVEL GAUGE OF DRIVEN SENSOR TYPE

This application is a Continuation of application Ser. No. 08/039,098, filed Jul. 29, 1993 now abandoned.

BACKGROUND OF THE INVENTION

The present invention relates to a tank level gauge of the driven sensor type.

In, for example, FR-A-1,430,366, a sensor is suspended on a thread wound around a drum driven by a servomotor controlled by forces exerted on the thread. More particularly, when the sensor is located at a level to be measured, a reaction force equal and opposite to its apparent weight allows the assembly to be balanced.

With a level variation, an apparent weight of the sensor will vary and the correlative variation of the reaction force will be detected and cause a starting of the servomotor, in one direction or the other, until the sensor is positioned at the level to be measured.

Another type of the above described gauge is proposed in, for example, FR-A-2,625,313.

The improvement of FR-A-2,625,313 with respect to FR-A-1,430,366 relates to self feed, measuring accuracy and to the widest measurement range.

The present invention is considered to be an improvement with respect to FR-A-2,625,313.

SUMMARY OF THE INVENTION

One object of the invention to provide a gauge which, while having the features of the gauge disclosed in FR-A-2,625,313, is of more simple general design resulting in a lower cost.

Besides, the gauge according to the present invention has a very low power consumption level both for its own operation and for a possible remote transmission of data. A source of energy such as an array of photovoltaic cells for example is sufficient. It may even be envisaged, without departing from the scope of the present invention, to achieve transmission (and/or processing) of other types of data, such as pressure, temperature, within the gauge according to the invention.

Moreover, the gauge according to the present invention allows thread breakage to be avoided by using a magnetic coupling capable of uncoupling in case of an excessively high traction in the thread.

Besides, the present gauge must be capable of delivering measurements for at least two different interfaces within a single tank.

In accordance with the present invention, a gauge is provided which includes a drum wound around which is wound a thread on the end of which is suspended a driven level sensor, a reversible servomotor for driving said drum, means for driving the drum selectively in both directions, means for recording the drum rotation, and means for detecting a variation in the force in the thread, with the force being directly related to the relative position of the sensor with respect to the level to be measured.

According to the invention, said means for detecting the force in the thread comprise a means rotatably mounted about a horizontal axis, whose oscillation is limited by damping means and whose movement enables the force exerted on the thread to be measured.

Preferably, said means for detecting the variation in the force in the thread comprise a differential transformer whose output voltage is related to the (mechanical) tractive force in the thread.

Thus, the differential transformer may comprise a core connected to the oscillating means, and a coil connected to a fixed part of the gauge.

The damping means may advantageously consist of a magnetic device.

More particularly, the magnetic device consists of at least one magnet connected to the oscillating means and of a plurality of magnets connected to a fixed part of the gauge.

Besides, the servomotor may be a step motor whose rotation is triggered by a variation in the output voltage of said differential transformer with respect to a reference voltage.

Advantageously, the gauge according to the invention may comprise means for ensuring self power supply, means for detecting running anomalies, means for preventing thread breakage.

Besides, the gauge according to the invention can detect the level of several interfaces.

BRIEF DESCRIPTION OF THE DRAWINGS

Other features and advantages of the invention will be clear from reading the description hereafter, given by way of non limitative examples, with reference to the accompanying drawings wherein:

FIG. 1 is a longitudinal cross-sectional view of the gauge according to the invention, FIG. 2 is a side view of the gauge according to the invention, FIG. 3 is a cross-sectional view of a control means for driving the motor, FIG. 4 is a cross-sectional view of a means for damping a means for detecting a variation in the force in the thread, FIG. 5 is a fragmentary top view of a card for controlling the assembly according to the invention.

DESCRIPTION OF THE PREFERRED EMBODIMENTS

In FIG. 1, references 100 and 103 refer in a general way to the housing of the gauge, mainly cylindrical and whose inner space is separated into two parts A, B by a tight partition 101.

Part A, to the left of the partition 101 in FIG. 1, includes the mechanical parts while the explosion proof part B includes the most sensitive components of the gauge.

Part A may be closed at its end by a cover 102 sealing it from the ambient medium, except for an opening 105 allowing passage of the thread.

Furthermore, a foot 106 may be fixed on the housing 100 so as to fasten the latter to the tank in which measurements are to be achieved. An opening 107 is provided in line with opening 105, with the assembly ensuring the vertical guiding of the thread.

Part A thus forms an almost tight enclosure communicating only through opening 105 with the top of the tank. The latter may commonly contain gases at a pressure of the order of 25 bars.

Part B, which includes all the electromagnetic parts, is totally insulated, from part A, and from the ambient atmosphere. This insulation is necessary for the trouble-free operation of the parts present inside, and also to prevent a possible deflagration in this zone from allowing propagation of the flame towards the outside of part B.

A window 104, located at the end of housing 103, allows, for example, the height measured to be read.

A passage 108 for electric wires and cables is also provided from part B, this passage being of course sealed, for example with a stuffing box, so as to preserve the insulation of volume B.

The mechanical parts contained in part A, of a conventional construction, comprises a drum 200 around which is wound the thread. According to the invention, the thread is made from "KEVLAR" (registered trademark) or from any other material having substantially the same tensile strength, but with a density markedly lower than that of the materials used previously. This feature is very advantageous, notably concerning the sensitivity of the sensor.

A sensor, which will be preferably semi-immersed at the level of the interface to be measured, is suspended on the end of the thread. The sensor may, for example, have the shape of a 140-mm diameter plastic disk with a mass of about 300 grams.

The drum 200 of horizontal axis preferably has an outer peripheral surface 201 machined with a very high precision so that, for example a 1° rotation corresponds to a 1-mm wire length, or to a finite number of mm. A simple relationship will preferably exist between the angle of rotation of the drum and the unwound thread or wire length.

The drum 200 is fitted with a central hub 202 integral in rotation but not in translation with a central drive shaft 210. An assembly comprising, for example, an endless screw 120 engaged on a tapped part of hub 202, co-operating with a groove and a key 203 in the drive shaft 210, may ensure simultaneous rotation and translation of the drum so that the thread always leaves the drum axially to opening 105.

A housing 110 fixed, for example, on a centrally disposed partition wall 101 through fasteners such as, for example, screws 111 may constitute an end bearing for the assembly defined above. The partition wall 101 may be fashioned of an aluminum material. Housing 110 comprises an opening 112 disposed in a alignment with the openings 105 and 107 for allowing a passage of the thread or wire.

The other bearing of shaft 210 is preferably located in the thickness of the partition wall 101. An antifriction bearing 212 may be provided to that end.

A minimum rotational friction torque is thus obtained, so that a very low variation, of the order of 0.01 to 0.02 Newton, in the force in the thread, is perceptible at the level of the bearing.

A male part 220 of a magnetic coupling is advantageously borne by a bearing (not referenced) located close to the central wall 101.

The complementary (female) part 320 of the magnetic coupling is then located opposite the male part 220. A thin zone 208 of the partition wall 101 is interposed between each part 220 and 320 of the magnetic coupling.

Coupling is provided here by a magnetic effect through the non-magnetic wall 208. This coupling enables rotatable driving, without contact, of the elements located in part A of the gauge through elements rotatably linked with the motor, that is located in part B, and vice versa.

Advantageously, this coupling may be interrupted in case of an overload at the level of the sensor. This "uncoupling" function of the coupling in case of an incident notably allows breakage of the thread to be prevented.

In another version of the gauge according to the invention, where the tank is under low pressure, the magnetic coupling may be advantageously suppressed by installing a shaft running through the wall 101. The shaft ensures the connection in rotation of the mechanical parts located in parts A and B. Of course, sealing means are mounted on the shaft, at the level of the partition wall 101, in order to preserve the anti-explosive nature of part B.

The lay-out of the elements in volume A such as it has been described may be considered as well-known.

Part B advantageously accommodates means for detecting a variation in the tensile/tractive force in the thread or wire, control means for driving a servomotor, and means for damping the detection means around a position of equilibrium.

The means for detecting a variation in the tractive force in the thread preferably includes an oscillating arm 310 which will be described in connection with FIG. 2.

On the oscillating arm 310 are fastened the control means for driving the motor, a cross-sectional view of which is shown in FIG. 3, as well as the means for driving the oscillating arm around an equilibrium or reference position.

One or several balancing weights 330 may also be fastened on the oscillating arm if necessary.

The female part 320 of the magnetic coupling is integral, through a support 300, with a pinion 350 driven by an endless screw 351 of vertical axis, which is itself actuated by a servomotor 150 such as a step motor.

By way of example, the motor chosen performs forty-eight steps per turn, the demultiplication at the pinion 350—endless screw 351 level is a hundredth and the circumference of drum 200 is 480 mm, so that, for each step of the motor, the travel of the sensor is $\frac{1}{10}$ mm.

The man skilled in the art will be able to modify the transmission consisting of pinion 350 and endless screw 351, by replacing them with a pair of conical or cylindrical gears with a spur or helical toothing. Furthermore, in order notably to improve the transmission efficiency and to decrease the inertia on the drive shaft, a gear reducer may be interposed in these transmission variants.

The motor 150 is fastened on the side of an oscillating arm. The control system for driving the motor is fastened on the other side of the oscillating arm (with respect to its axis of rotation). This system may consist of a differential transformer whose core 302 is connected to the oscillating arm 310 and whose fixed coil 301 is connected to a fixed part of the gauge, such as wall 101, through a support 304.

Thus, under the effect of a variation in the apparent weight of the sensor, the oscillating arm 310 is driven into rotation at the same time as pinion 350, endless screw 351, linking part 300, the female part 320 of the magnetic coupling and of course the core 302 of the differential transformer.

The latter thus detects this variation, which is translated into a variation in the voltage at the output terminals of the transformer, which triggers the motor drive. More precisely, when the unit or units controlling the servomotor 150 detects a variation in the voltage at the terminals of the differential transformer, it sends, towards the element driving the servomotor 150, an electric impulse leading the servomoter to rotate by one step, in one direction or the other, according to the voltage detected . . . and so forth, until the voltage detected is again equal to a given reference voltage, that is until the oscillating arm is stabilized in a position of equilibrium. Simultaneously, a counter 401 counts and uncounts the steps of the servomotor. The output signal of the differential transformer also indicates the direction of unbalance of the oscillating arm, hence the direction of rotation of the motor necessary to rebalance the oscillating arm.

According to an advantageous feature of the invention, the control unit co-operates with an information processing unit so that the voltage detected at the terminals of the transformer may be compared with one of the reference voltages corresponding each to an interface. Each interface corresponds to an apparent weight.

Besides, a damping system is provided around at least one balancing position. This system makes it possible to avoid "surging" during a stabilization of the sensor around the level to be measured.

As shown in FIG. 4, an advantageous damping system includes a permanent magnet 306 fastened on an oscillating arm 310 by a support 305. Two permanent magnets 307 and 308, identical to the magnet 306 are located opposite to the magnet 306 so that the faces of equal polarity face one another. The magnets 307, 308 are carried by a support 309, 311 fastened on a fixed element of the gauge such as, for example, the wall 101. Thus, when the magnet 306 is equidistant from each of the magnets 307, 308, the resultant of the repulsive powers is zero.

The damping system is positioned in such a way that, at an interface equilibrium, magnet 306 is equidistant from each one of magnets 307, 308. When arm 310 slants, one of the air gaps decreases while the other increases by the same value. Thus, the repulsive force existing between the magnets getting closer to one another increases as a function of the reciprocal value of the square of the value of the air gap, whereas the repulsive force between the magnets moving away from one another decreases according to the same law. An almost perfect damping is thus obtained.

For another interface, damping will be achieved around another position.

The damping system which has been described is a non limitative example. Any other elastic system fulfilling the same function may of course be used without departing from the scope of the present invention.

It will notably be possible to use a damping system based on an electromagnetic or hydraulic principle.

In the first principle, a copper coil integral with arm 310 moves with the arm inside an annular magnetic field. The displacement causes in the coil a Foucault current which generates an opposing electromotive force which opposes the displacement, thereby causing damping.

In the second, hydraulic principle, a piston consisting of a deformable diaphragm is connected to said oscillating arm. The diaphragm forms a deformable wall of an enclosure containing a fluid. The enclosure communicates with a fluid reserve through a calibrated opening or nozzle.

When arm 310 oscillates, the diaphragm is driven into the same movement, thereby varying the volume of the enclosure. The fluid is expelled or introduced according to a flow regulated by the size of the nozzle, thus generating a hydraulic damping of the oscillation of arm 310.

As it has already been briefly explained above, the values of the apparent weights of the sensor at each interface are preferably obtained by calibration, and the values of the corresponding reference voltages ($V_{REF1}$, $V_{REF2}$ ...) are stored in a data processing means so as to control the output voltage of the differential transformer (301, 302) through one of said reference voltage values.

Besides, as it has already been stated above, the electric consumption of the gauge according to the invention is low since the motor only runs during level search periods. Moreover, the electric consumption of the other electric parts is very low.

Advantageously, the gauge according to the invention is capable of detecting any anomaly very rapidly and in a very reliable way.

In fact, in normal operation, the output voltage of the differential transformer tends toward a reference voltage (the oscillating arm tending towards its position of equilibrium). Consequently, any significant voltage variation, higher than a certain threshold during a given time interval, is related to a malfunction of the apparatus. In this case, the apparatus will be capable of giving the alarm and even of detecting certain types of failures.

For example, the loss or uncoupling of the sensor will generate a constant negative voltage of a given and measurable value, the servomotor failure will generate an abnormally high voltage, positive or negative, in dependence upon whether the sensor is immersed or not, and the sticking of the sensor inside the tank will also generate an abnormal voltage.

The gauge according to the invention is capable of recognizing these cases and of generating an alarm signal upon the recognition of such cases. If breakage were to occur, the mechanism for detecting drum rotation may be automatically detected.

Furthermore, in case of a magnetic uncoupling at the level of coupling (220, 320), the abnormally high rotation of the oscillating arm 310 will actuate a microswitch 312. The latter may, for example, trigger an alarm signal, but this piece of information will notably be recorded in the data processing system as an "information drop-out" which will cause the thread to go up to an extreme position and bring about the zeroizing of the counter associated with the step motor.

The contact between the sensor a stop or abutment dog may be recorded as an absolute zero or as a reference height by any data acquisition system known in the art.

In fact, the gauge according to the invention may be advantageously connected to a data acquisition and processing system.

The electric components of the gauge according to the invention are basically the differential transformer 301, 302, the step motor 150, the feeding devices (not referenced)

The controls 402 of these parts and the counter 401, and possibly the indicators, are preferably grouped together on a single card 400 located in volume B. The electric linking wires or cables may for example come out of volume B through the pipe 108 running through the wall of transverse partition 101.

The information delivered by the motor control unit may be transmitted, by means of a bus, towards a processing unit such as a microcomputer capable of receiving and emitting other types of data (for example pressure, temperature within the tank) which are themselves delivered by the gauge according to the invention and/or by another equipment.

Without departing from the scope of the invention, the data supplied by the gauge may also be transmitted by radio waves, by means of an emitting circuit located for example on the top of the gauge. A receiver may be provided to receive orders from a control device by remote control.

The gauge according to the invention may be remote controlled and may be adapted to measure an oil/water interface or an oil/air interface, with zeroizing of the system also being for example, remote controlled.

Furthermore, the electric supply of the gauge according to the invention may be provided by photovoltaic cells since, as it has already been stated, all the electric (and electronic) parts of the system have a low consumption. It should particularly be noted that, in a position of equilibrium, the step motor is off and therefore consumes no energy.

Of course, the system which has been described may be provided with other modifications and/or additions by the man skilled in the art without departing from the scope of the present invention.

We claim:

1. An improved tank level gauge for comprising:

an oscillating device, coupled to a level sensor and rotatable about a reference position, which rotationally moves about the reference position in response to a change in level of a first fluid in the tank caused by movement of the level sensor produced by a change in apparent weight of the level sensor during following an interface between the first fluid and a second fluid above the first fluid;

a sensor for sensing movement of the oscillating device and producing an output representation of the sensed movement;

a damping system, coupled to the oscillating device, for damping movement of the oscillating device in response to movement of the level sensor in response to the change in level of the first fluid in the tank;

a motor, rotationally coupled to the oscillating device and to the output of the sensor, for driving the oscillating device in a direction opposite to the direction of movement caused by the level sensor in response to the sensor output; and means, responsive to activation of the motor, for producing an output representative of the interface level representing the level of the first fluid in the tank.

2. An improved tank level gauge in accordance with claim 1 wherein:

the means, responsive to the activation of the motor, comprises a counter, the damping system damps movement of the oscillating device in a first direction representing upward movement of a level of the first fluid in the tank relative to the level sensor and a second direction representing downward movement of the level of the first fluid in the tank; and further comprising a motor control system, coupled to the sensor and to the motor which, responsive to a variation in output voltage from the sensor caused by movement of the oscillating device, which drives the motor in the opposite direction until the output voltage is again equal a reference voltage which is set in accordance with the interface with the control system being programmable with a plurality of different voltages each representing a different interface between the first and second fluids.

3. An improved tank level gauge in accordance with claim 2 wherein:

the movement of the damping system in the first direction produces a damping force which increases as the oscillating device moves from an equilibrium position in the first direction and the movement of the damping system in the second direction produces a damping force which increases as the oscillating device moves from the equilibrium position in the second position.

4. An improved tank level gauge in accordance with claim 3 wherein:

the damping force is a function of a reciprocal value of a square of a distance between a part of the damping system mounted on the oscillating device and another part of the damping system mounted in a fixed position relative to the oscillating device.

5. An improved tank level gauge in accordance with claim 4 wherein:

the part is a first permanent magnet; and the another part is a pair of permanent magnets which respectively have faces which are opposed to first and second faces of the first permanent magnet.

6. An improved tank level gauge in accordance with claim 5 wherein:

the permanent magnets produce a magnetic force which repels a magnetic force produced by the first and second faces of the first permanent magnet.

7. An improved tank level gauge in accordance with claim 1 wherein:

the oscillating device is an oscillating arm.

8. An improved tank level gauge in accordance with claim 2 wherein:

the oscillating device is an oscillating arm.

9. An improved tank level gauge in accordance with claim 3 wherein:

the oscillating device is an oscillating arm.

10. An improved tank level gauge in accordance with claim 4 wherein:

the oscillating device is an oscillating arm.

11. An improved tank level gauge in accordance with claim 5 wherein:

the oscillating device is an oscillating arm.

12. An improved tank level gauge in accordance with claim 6 wherein:

the oscillating device is an oscillating arm.

* * * * *